Feb. 25, 1969     R. W. McWHORTER     3,429,799
FLUID TIGHT ELECTRICAL CONNECTIONS FOR ELECTROLYTIC CELLS
Filed May 31, 1966

INVENTOR.
ROBERT W. McWHORTER

BY *Kelly O. Corley*

ATTORNEY

United States Patent Office 3,429,799
Patented Feb. 25, 1969

3,429,799
FLUID-TIGHT ELECTRICAL CONNECTIONS FOR ELECTROLYTIC CELLS
Robert W. McWhorter, Pensacola, Fla., assignor to Monsanto Company, St. Louis, Mo., a corporation of Delaware
Filed May 31, 1966, Ser. No. 553,852
U.S. Cl. 204—279                9 Claims
Int. Cl. B01k 3/02

The present invention relates to fluid-tight electrical connections for electrolytic cells and more particularly to such connections which provide for fluid sealing in the absence of tension applied to soft metal electrodes.

In electrolytic cells, it is sometimes necessary to use electrode metals having relatively low tensile strength. Such metals are typified by lead, silver, lead-silver alloys, and the like. Such a cell is disclosed in an application by Danly and McWhorter, Ser. No. 553,851, filed May 31, 1966, entitled, "Electrolytic Cell," the disclosure of which is incorporated herein by reference. When using such soft metal electrodes, it is difficult to secure the electrodes to the supporting insulating blocks and provide electrical connections through the blocks to the electrodes, while providing fluid-tight seals about the connections to prevent leakage or mixing of fluid in adjacent cell compartments. These problems are solved effectively by the present invention.

A primary object of the invention is to provide for mounting an electrode on an insulating block, and providing a fluid-tight seal about the connector, without placing the soft electrode metal under tension.

A further primary object is to provide a fluid-sealed electrical connection through an insulating block to a soft metal electrode, without placing the soft metal under tension.

Other objects of the invention will in part be obvious and will in part appear hereinafter.

For a more complete understanding of the nature and objects of the invention, reference should be had to the following detailed description taken in connection with the accompanying drawings, in which.

Figure 1:
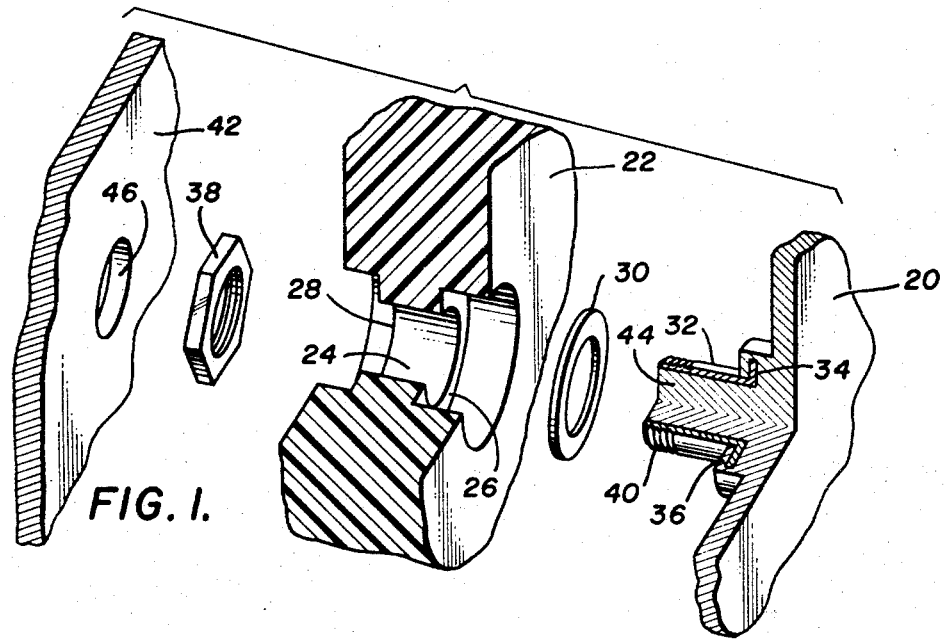
FIGURE 1 is an exploded perspective view, partly broken away, of the preferred embodiment of the invention.

Referring now to FIGURE 1, electrode 20 of a soft metal (such as lead) is to be attached to insulating support block 22 while maintaining a fluid-tight seal so that fluid cannot flow from one side of block 22 to the other side of block 22. Bore 24 extends entirely through block 22 from its rightmost to its leftmost surface as viewed in FIGURE 1, and is counterbored on each side to provide planar surfaces 26 and 28 perpendicular to the axis of bore 24. Annular gasket 30 is provided for insertion in the rightmost counterbore.

Figure 2:
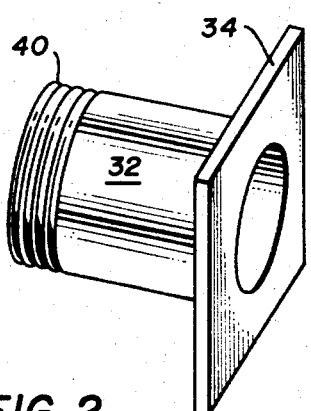
FIGURE 2 is a perspective view of the structural member illustrated in FIGURE 1.

FIGURE 1 is an exploded perspective view, partly broken away, of the prefered embodiment of the invention;

FIGURES 1 and 2 illustrate structural member 32, preferably in the form of a right circular cylinder having a radially extending flange or head 34 imbedded in the soft metal of electrode 20. Flange 34 extends radially outwardly from the axis of cylinder 32 sufficiently far to oppose surface 26. A portion of the soft metal electrode extends around flange 34 to form a radially inwardly directed soft metal flange 36. Flange 34 may be so formed so as to have a noncircular cross-section in the plane perpendicular to the axis of cylinder 32, so that when imbedded in electrode 20, rotation of cylinder 32 is prevented.

Securing means are provided for urging cylinder 32 axially to the left as viewed in FIGURE 1, so that gasket 30 is compressed between soft metal flange 36 and the bottom of the associated counterbore. This securing means is illustrated as nut 38 in cooperation with threads 40 on cylinder 32.

To assemble the apparatus, gasket 30 is slid along cylinder 32 until it abuts flange 36. Member 32 is then inserted through bore 24, seating gasket 30 against the bottom of rightmost counterbore as viewed in FIGURE 1. Nut 38 is then threaded on threads 40 and tightened sufficiently to compress gasket 30. It should be particularly noted that in the resulting structure no part of the soft metal is under tension: the only portion of the soft metal under stress is flange 36 which is under compression. The tension necessary to compress gasket 30 and provide the fluid sealing is borne by structural member 32, which is formed from a material having higher tensile strength than the electrode material.

It should be noted that the counterbores on opposite ends of bore 24 were provided primarily to reduce or eliminate clearance between block 22 and the opposed faces of electrodes 20 and 42, and thus the counterbores are not critical to all aspects of the invention.

Figure 3:
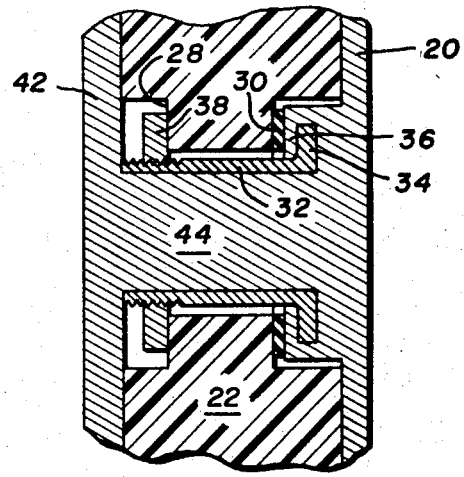
FIGURE 3 is a sectional view of the completed and assembled connector according to the invention.

In the preferred embodiment, electrode 20 was a cathode, formed of lead (99.99% pure), and was connected to a lead-silver anode electrode 42 (approximately 1% silver, with the remainder lead). Member 32 with its flange 34, and nut 38, were formed from titanium. To facilitate passage of electrical current from electrode 20 to electrode 42, cylinder 32 included a coaxial bore filled with soft metal filling 44 integrally joined to electrode 20, as by welding. Filling 44 was then welded to electrode 42, to form a continuous conductive path of soft metal integrally joining electrodes 20 and 42, as illustrated in FIGURE 3.

For convenience of access during the welding operation, an aperture 46, aligned with member 32, was provided through anode 42, after which aperture 46 was filled with molten soft metal to effect the weld and integrally join filling 44 to anode 42. Advantageously, filling 44 and the welding joining filling 44 to anode 42 are made of the same lead-silver composition as is anode 42, since this both increases its conductivity and reduces the tendency for anolyte fluid in contact with anode 42 to corrode the anode in the vicinity of the weld.

The continuous conductive soft metal path connecting electrodes 20 and 42 is an important feature of the invention, since it insures low electrical resistance between the electrodes. This feature can become important if the structural member 32 has high electrical resistance. In some cases, such, for example, as when member 32 is formed from titanium, member 32 becomes covered with resistive surface film which hinders passage of electrical current therethrough. In such instances, the continuous conductive soft metal path reduces power loss due to the internal resistance of the connections, as well as reducing heat generation in the connection.

When flange 34 is resistant to the materials contacting electrode 20, the soft metal flange 36 may be omitted, with flange 34 seating directly on gasket 30. However, flange 36 protects flange 34 from such corrosion when this is a problem.

Selection of appropriate materials of construction will depend on the particular application, including a consideration of the nature of the electrolytic fluids employed, temperatures, etc. Typically, block 22 may be made of polypropylene, and gasket 30 may be made of rubber. The materials noted above for electrodes 20 and 42, and for member 32 and nut 38, are satisfactory when the anode contacts aqueous sulfuric acid and when the cathode contacts a catholyte composition containing about 30–35% water, 35–40% quaternary ammonium salt (such as tetraethylammonium ethylsufate), and the remainder acrylonitrile, adiponitrile, and other reaction products.

From the above description and accompanying drawings it may be seen that the present invention provides for mounting a soft metal electrode on an electrically conducting connector which extends through an insulating support block, and providing a fluid-tight seal about the connector, without placing the soft metal electrode material under tension. The connector according to the invention is simple in design and economical and reliable in construction and operation.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

It is also understood that the following claims are intended to cover all of the generic and specific features of the invention described, and all statements of the scope of the invention which, as a matter of language, might be said to fall therebetween.

Having described my invention, what I claim as new and desire to secure by Letters Patent is:

1. Apparatus for sealingly securing an electrode formed of a soft metal to an insulating supporting block, comprising in combination:
   (a) means defining a block bore extending through said insulating block from a first surface thereof to the opposite surface,
   (b) a first soft metal electrode,
   (c) a structural metal member extending along an axis through said block bore and including a first flange extending radially outwardly from said axis sufficiently far to oppose said first surface around said block bore, said flange being imbedded in said electrode,
   (d) a compressible gasket surrounding said member between said first flange and said first surface, and
   (e) securing means engaging said member and said opposite surface of said block for urging said member axially toward said opposite surface, whereby said gasket is sealingly compressed without applying tension to said soft metal.

2. The apparatus defined in claim 1, wherein said securing means includes a nut engaging threads formed on the exterior of said member.

3. The apparatus claimed in claim 1, wherein said flange has a noncircular cross-section in a plane perpendicular to the axis of said member.

4. The apparatus defined in claim 1, wherein said electrode is complementary to and surrounds said first flange.

5. The apparatus defined in claim 1, wherein said first electrode includes a radially inwardly directed second flange of said soft metal extending between said first flange and said first surface.

6. The apparatus defined in claim 1, further comprising:
   (a) means defining a second bore axially extending through said member,
   (b) and a soft metal conductor within said second bore and connecting with said electrode, whereby an electrical connection extends from said opposite surface to said electrode.

7. The apparatus defined in claim 6, wherein said conductor fills said second bore.

8. The apparatus defined in claim 6, further comprising a second electrode connected to said conductor.

9. The apparatus defined in claim 8, wherein said conductor integrally connects said first electrode and said second electrode.

References Cited

UNITED STATES PATENTS

| | | | |
|---|---|---|---|
| 2,816,069 | 12/1957 | Andrus | 204—286 XR |
| 3,133,873 | 5/1964 | Miller et al. | 204—286 XR |

ROBERT K. MIHALEK, *Primary Examiner.*

D. R. JORDAN, *Assistant Examiner.*

U.S. Cl. X.R.

204—194, 286, 288